United States Patent
Watkins et al.

(10) Patent No.: US 7,194,073 B2
(45) Date of Patent: Mar. 20, 2007

(54) METHOD FOR AUTOMATICALLY REPLENISHING PRE-PAID CALLING UNITS WITHIN A TELEMATIC UNIT

(75) Inventors: Gary A. Watkins, Royal Oak, MI (US); Christopher L. Oesterling, Troy, MI (US)

(73) Assignee: General Motors Corporation, Detroit, MI (US)

( * ) Notice: Subject to any disclaimer, the term of this patent is extended or adjusted under 35 U.S.C. 154(b) by 671 days.

(21) Appl. No.: 10/706,658

(22) Filed: Nov. 12, 2003

(65) Prior Publication Data

US 2005/0100148 A1    May 12, 2005

(51) Int. Cl.
    *H04M 15/00*    (2006.01)

(52) U.S. Cl. .............................. 379/114.2; 379/114.16; 455/407

(58) Field of Classification Search ........... 379/114.01, 379/114.09, 114.16, 114.17, 114.2, 130–131, 379/144.01; 455/405–408, 550.1
See application file for complete search history.

(56) References Cited

U.S. PATENT DOCUMENTS

| | | | |
|---|---|---|---|
| 5,749,052 A * | 5/1998 | Hidem et al. | 455/406 |
| 6,430,406 B1 * | 8/2002 | Frisk | 455/407 |
| 6,526,273 B1 * | 2/2003 | Link et al. | 455/406 |
| 6,735,290 B1 * | 5/2004 | Rauba | 379/114.16 |
| 6,934,529 B2 * | 8/2005 | Bagoren et al. | 455/406 |
| 2003/0027549 A1 * | 2/2003 | Kiel et al. | 455/405 |
| 2003/0157925 A1 * | 8/2003 | Sorber et al. | 455/406 |
| 2005/0061872 A1 * | 3/2005 | Paschini et al. | 235/380 |

* cited by examiner

*Primary Examiner*—Binh K. Tieu
(74) *Attorney, Agent, or Firm*—Anthony Luke Simon

(57) ABSTRACT

In a system including a telematics unit and a data center, a method for automatically replenishing pre-paid calling units within the telematics is based on an occurrence of a trigger event as detected by the telematics units. Upon being notified of the trigger event, the data center automatically uploads a replenishment package to the telematics unit or uploads a replenishment package selected by the telematics unit.

21 Claims, 3 Drawing Sheets

METHOD FOR AUTOMATICALLY REPLENISHING PRE-PAID CALLING UNITS WITHIN A TELEMATIC UNIT

FIELD OF THE INVENTION

In general, the invention relates to mobile application services in telematics units. More specifically, the invention relates to a method for automatically replenishing calling units within a mobile communication unit.

BACKGROUND OF THE INVENTION

A mobile application service provider provides information and services to the vehicles of subscribers from a data center through a vehicle installed wireless telecommunication apparatus. Examples of types of services provided are emergency response assistance, roadside service assistance, location-based services such as turn-by-turn directions, pre-paid personal calling, phone number directory lookup assistance, and points of interest lookup. These services may be offered on pre-paid or non-prepaid arrangements.

One way of offering prepaid personal calling is by offering packages of pre-paid usage. Usage for example, can be measured in units, in terms of the number of minutes of operator assistance or amount of data transfer. When the pre-paid units are completely consumed, they must be replenished for the service to continue. This will require the subscriber to contact the service provider to purchase more units of service. Although service replenishment may be performed using the vehicle installed wireless telecommunication apparatus to connect to the data center, it requires the subscriber to interact with an automated voice system or a service representative to purchase the desired pre-paid service package.

Thus, there is a significant need for a method and system for automatically replenishing mobile application services in a vehicle so that the subscriber services remain uninterrupted.

SUMMARY OF THE INVENTION

One embodiment of the invention provides a method including the steps of operating the telematics unit to automatically report an occurrence of a trigger event to the data center and operating the data center to communicate a replenishment package to the telematics unit subsequent to the occurrence of the trigger event, wherein the replenishment package includes a first set of calling units. The method further includes operating the telematics unit to automatically replenish itself with the first set of calling units in response to a reception of the replenishment package.

Another aspect of the invention provides a system including a telematics unit operable to automatically report an occurrence of a trigger event to said data center; and a data center operable to communicate a replenishment package to said telematics unit subsequent to the occurrence of the trigger event, wherein the replenishment package includes a first set of calling units, wherein said telematics unit is further operable to automatically replenish itself with the first set of calling units in response to a reception of the replenishment package.

Yet another aspect of the invention describes a telematics unit including means for automatically reporting and communicating an occurrence of a trigger event to a data center; and means for automatically replenishing itself with a first set of calling units in response to a reception of a replenishment package from the data center, wherein the reception of the replenishment package from the data center corresponds to the communicated occurrence of the trigger event.

The foregoing forms and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
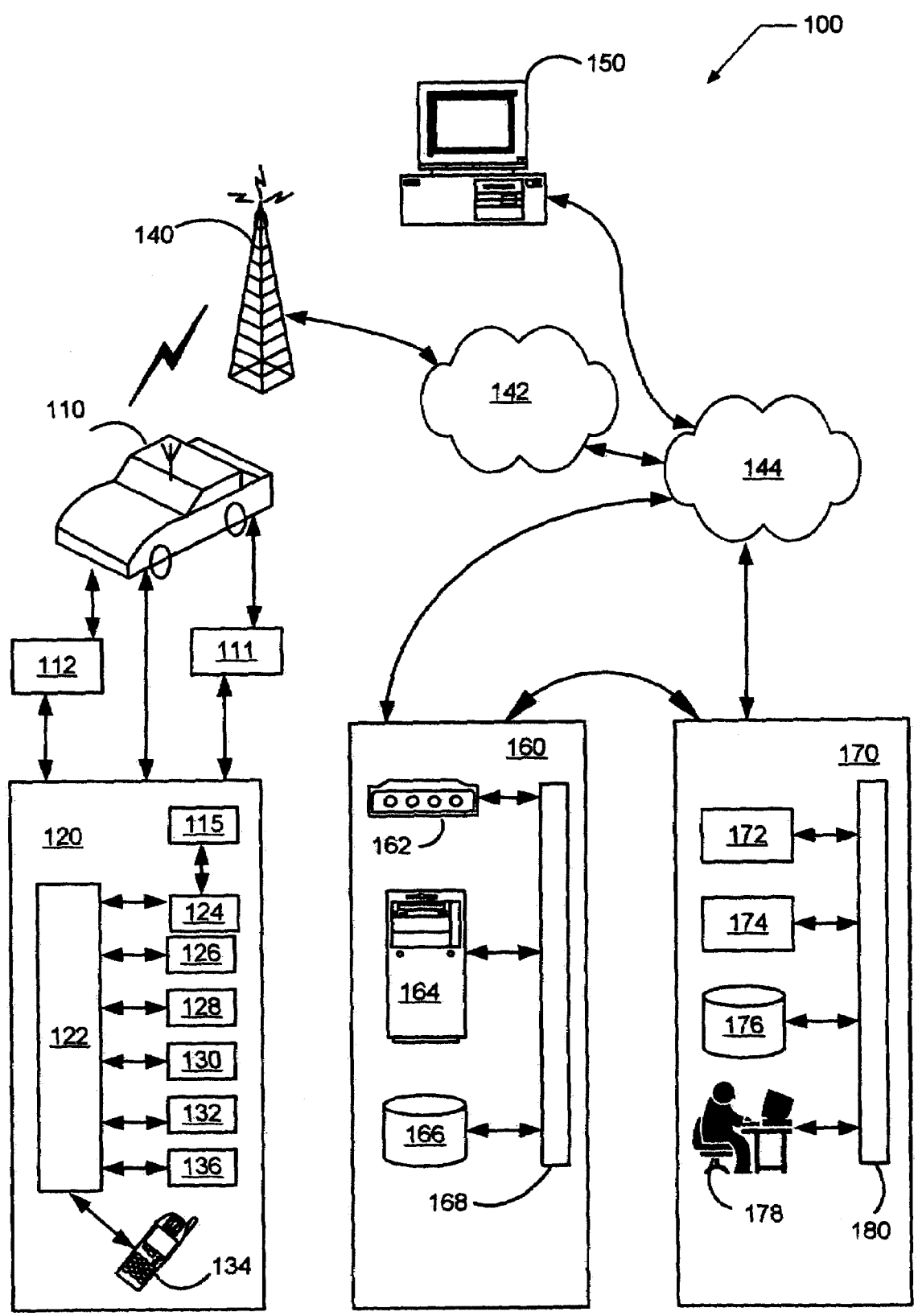
FIG. 1 illustrates one embodiment of a system for communicating from a telematics unit to a data center in accordance with the present invention.

FIG. 1 is an illustrative operating environment for a vehicle in an embodiment of the present invention. FIG. 1 shows a vehicle communication system 100. Vehicle communication system 100 includes at least one vehicle 110 including vehicle communication bus 112 and telematics unit 120, one or more wireless carrier systems 140, one or more communication networks 142, one or more land networks 144, one or more client, personal or user computers 150, one or more web-hosting portals 160, and one or more call centers 170. In one embodiment, vehicle 110 is implemented as a mobile vehicle equipped with suitable hardware and software for transmitting and receiving voice and data communications.

In one embodiment, telematics unit 120 is a vehicle communications unit that includes a digital signal processor (DSP) 122 connected to a wireless modem 124, a global positioning system (GPS) unit 126, an in-vehicle memory 128, such as, for example, a non-volatile flash memory, a microphone 130, one or more speakers 132, an embedded or in-vehicle mobile phone 134, and a wireless access point node 136. DSP 122 is also referred to as a micro-controller, controller, ASIC, host processor, or vehicle communications processor. GPS unit 126 provides longitude and latitude coordinates of the vehicle, as well as a time stamp. In-vehicle mobile telephone system 134 is a cellular-type phone, such as, for example an analog, digital, dual-mode, dual-band, multi-mode or multi-band cellular phone. In another example, the mobile telephone system is an analog mobile telephone system operating over a prescribed band nominally at 800 MHz. In another example, the mobile telephone system is a digital mobile telephone system operating over a prescribed band nominally at 800 MHz, 900 MHz, 1900 MHz, or any suitable band capable of carrying digital cellular communications.

In one example, modem 124 includes a Prepaid Personal Calling ("PPC") loading module 115 capable of communication with at least one call center 170. In one embodiment of the invention, PPC loading module 115 is an embedded component of the modem 124 capable of providing a wireless communication link between the telematics unit 120 and call center 170. In another embodiment, the PPC loading module 115 is external to the modem 124, and in communication with the telematics unit 120. PPC loading module 115 is configured to perform at least the methods disclosed herein. In one embodiment, PPC loading module 115 is pre-programmed with an initial, predetermined number of PPC units. In a second embodiment, PPC loading module 115 secures an initial number of PPC units from call center 170. A replenishment package is a package of PPC units. In one embodiment, a replenishment package is a predetermined number of units. For example, a replenishment package may increase the number of PPC units by 150 units. In another embodiment, replenishment package increases an existing number of units to a predetermined number of units. In another example, a replenishment package may increase the number of PPC units to 150 units.

DSP 122 executes various computer programs and communication control and protocol algorithms that control communication, programming and operational modes of electronic and mechanical systems within vehicle 110. In one embodiment, DSP 122 is an embedded system controller. In another embodiment, DSP 122 controls communications between telematics unit 120, wireless carrier system 140, and call center 170. In another embodiment, DSP 122 controls communications between the wireless access point node 134 and nodes of a mobile ad hoc network. In one embodiment, a speech-recognition application is installed in DSP 122 to translate human voice input through microphone 130 into digital signals. DSP 122 generates and accepts digital signals transmitted between telematics unit 120 and a vehicle communication bus 112 that is connected to various electronic modules in the vehicle 110. In one embodiment, the digital signals activate a programming mode and operation modes, as well as provide for data transfers. In another embodiment, a vehicle data upload (VDU) utility program facilitates the transfer of instructions and data requests to vehicle 110.

Vehicle 110, via a vehicle communication bus 112, sends signals to various units of equipment and systems within the vehicle 110 to perform various functions such as monitoring the operational state of vehicle systems, collecting and storing data from the vehicle systems, providing instructions, data and programs to various vehicle systems and calling from telematics unit 120. In facilitating interactions among the various communication and electronic modules, vehicle communication bus 112 utilizes bus interfaces such as controller-area network (CAN), J1850, International Organization for Standardization (ISO) Standard 9141, ISO Standard 11898 for high-speed applications, and ISO Standard 11519 for lower speed applications.

Vehicle 110, via telematics unit 120, sends and receives radio transmissions from wireless carrier system 140. Wireless carrier system 140 is implemented as any suitable system for transmitting a signal from mobile vehicle 110 to communication network 142. Wireless carrier system 140 incorporates any type of telecommunications in which electromagnetic waves carry signal over part of or the entire communication path. In one embodiment, wireless carrier system 140 transmits analog audio, digital audio (including, but not limited to, CDMA, TDMA, FDMA, GSM) and/or video signals. In an example, wireless carrier system 140 transmits analog audio and/or video signals such as those sent from AM and FM radio stations and transmitters, or digital audio signals in the S band (approved for use in the U.S.) and L band (used in Europe and Canada). In one embodiment, wireless carrier system 140 is a satellite broadcast system broadcasting over a spectrum in the "S" band (2.3 GHz) that has been allocated by the U.S. Federal Communications Commission (FCC) for nationwide broadcasting of satellite-based Digital Audio Radio Service (DARS).

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to mobile vehicle 110 and land network 144. In one example, wireless carrier system 140 includes a short message service, modeled after established protocols such as IS-637 SMS standards, IS-136 air interface standards for SMS, and GSM 03.40 and 09.02 standards. Similar to paging, an SMS communication could be broadcast to a number of regional recipients. In another example, the carrier system 140 uses services in accordance with other standards, such as, for example, IEEE 802.11 compliant wireless systems and Bluetooth compliant wireless systems.

Land network 144 is, in one embodiment, a public-switched telephone network (PSTN). In one embodiment, land network 144 is implemented as an Internet protocol (IP) network. In other embodiments, land network 144 is implemented as a wired network, an optical network, a fiber network, another wireless network, or any combination thereof. Land network 144 is connected to one or more landline telephones. Land network 144 connects communication network 142 to user computer 150, web-hosting portal 160, and call center 170. Communication network 142 and land network 144 connects wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160 and vehicle 110. Personal or user computer 150 sends data requests to web-hosting portal through a web-page interface using communication standards such as hypertext transport protocol (HTTP), and transport-control protocol Internet protocol (TCP/IP). In one embodiment, the data includes directives to change certain programming and operational modes of electronic and mechanical systems within vehicle 110. In another embodiment, the data includes directives to send certain data such as operational modes of electronic and mechanical systems within vehicle 110. In operation, a user, such as, for example, a vehicle designer or manufacturing engineer, utilizes user computer 150 to access real-time data from vehicle 110 that is cached or stored in web-hosting portal 160. Data from client-side software is transmitted to server-side software of web-hosting portal 160. In one embodiment, data is stored at web-hosting portal 160. In another embodiment, client computer 150 includes a database (not shown) for storing received data. In yet another embodiment, a private Local Area Network (LAN) is implemented for client computer 150 and Web hosting portal 160, such that web hosting portal is operated as a Virtual Private Network (VPN).

Web-hosting portal 160 includes one or more data modems 162, one or more web servers 164, one or more databases 166, and a network 168. In one embodiment, web-hosting portal 160 is connected directly by wire to call center 170, or connected by phone lines to land network 144, which is connected to call center 170. In another embodiment, web-hosting portal 160 is connected to call center 170 without a direct wire connection, but with a connection allowing communication between the call center 170 and the web-hosting portal 160. Web-hosting portal 160 is connected to land network 144 by one or more data modems 162. Land network 144 sends digital data to and from modem 162; data that is subsequently transferred to web server 164. In one implementation, modem 162 resides inside web server 164. Land network 144 transmits data communications between web-hosting portal 160 and call center 170.

Web server 164 receives various data requests or instructions from user computer 150 via land network 144. In alternative embodiments, user computer 150 includes a wireless modem to send data to web-hosting portal 160 through a wireless communication network 142 and a land network 144. Data is received by modem 162 and sent to one or more web servers 164. In one embodiment, web server 164 is implemented as any suitable hardware and software capable of providing web services to transmit and receive data from user computer 150 to telematics unit 120 in vehicle 110. Web server 164 sends to or receives data transmissions from one or more databases 166 via network 168. Web server 164 includes computer applications and files for managing data.

In one embodiment, one or more web servers 164 are networked via network 168 to distribute data among its network components such as database 166. In an example, database 166 is a part of or a separate computer from web server 164. In one embodiment, web-server 164 sends data transmissions with data to call center 170 via modem 162, and through land network 144.

Call center 170 is a location where many calls are received and serviced at the same time, or where many calls are sent at the same time. In one embodiment, the call center is a telematics call center, facilitating communications to and from telematics unit 120 in vehicle 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more networks 180.

Switch 172 of call center 170 connects to land network 144. Switch 172 transmits voice or data transmissions from call center 170, and receives voice or data transmissions from telematics unit 120 in mobile vehicle 110 through wireless carrier system 140 and/or wireless access point node 136, communication network 142, and land network 144. Switch 172 receives data transmissions from, and sends data transmissions to, one or more web-hosting portals 160. Switch 172 receives data transmissions from, or sends data transmissions to, one or more communication services managers 174 via one or more networks 180.

Communication services manager 174 is any suitable hardware and software capable of providing communication services to telematics unit 120 in mobile vehicle 110. Communication services manager 174 sends to or receives data transmissions from one or more communication services databases 176 via networks 180. Communication services manager 174 sends to or receives data transmissions from one or more communication services advisors 178 via networks 180. Communication services database 176 sends to or receives data transmissions from communication services advisor 178 via networks 180. Communication services advisor 178 receives from or sends to switch 172 voice or data transmissions.

Communication services manager 174 facilitates one or more services, such as, but not limited to, enrollment services, navigation assistance, directory assistance, roadside assistance, business or residential assistance, information services assistance, emergency assistance, and communications assistance and vehicle data management services. Communication services manager 174 receives service requests for data from a user via user computer 150, web-hosting portal 160, and land network 144. Communication services manager 174 transmits and receives operational status, instructions and other types of vehicle data to telematics unit 120 in vehicle 110 through wireless carrier system 140, communication network 142, land network 144, wireless access point node 136, voice and data switch 172, and networks 180. Communication services manager 174 stores or retrieves vehicle data and information from communication services database 176. Communication services manager 174 provides requested information to communication services advisor 178.

In one embodiment, communication services advisor 178 is a real advisor. In another embodiment, communication services advisor 178 is implemented as a virtual advisor. In an example, a real advisor is a human being at service provider service center in verbal communication with service subscriber in mobile vehicle 110 via telematics unit 120. In another example, a virtual advisor is implemented as a synthesized voice interface responding to requests from telematics unit 120 in mobile vehicle 110.

Communication services advisor 178 provides services to telematics unit 120 in mobile vehicle 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in mobile vehicle 110 through wireless carrier system 140, communication network 142, and land network 144 using voice transmissions, or through communication services manager 174 and switch 172 using data transmissions. Switch 172 selects between voice transmissions and data transmissions.

Vehicle 110 initiates service requests to call center 170 by sending a voice or digital-signal command to telematics unit 120 which in turn, sends an instructional signal or a voice call through wireless modem 124, wireless carrier system 140, communication network 142, and land network 144 to call center 170. In another embodiment, the service request is for a vehicle data upload (VDU) that initiates a data transfer between vehicle 110 and service center 170 or web hosting portal 160. In another embodiment, the mobile vehicle 110 receives a request from call center 170 to send various vehicle data from mobile vehicle 110 through telematics unit 120 through wireless modem 124, wireless access point node 136, wireless carrier system 140, communication network 142, and land network 144 to call center 170.

Figure 2:
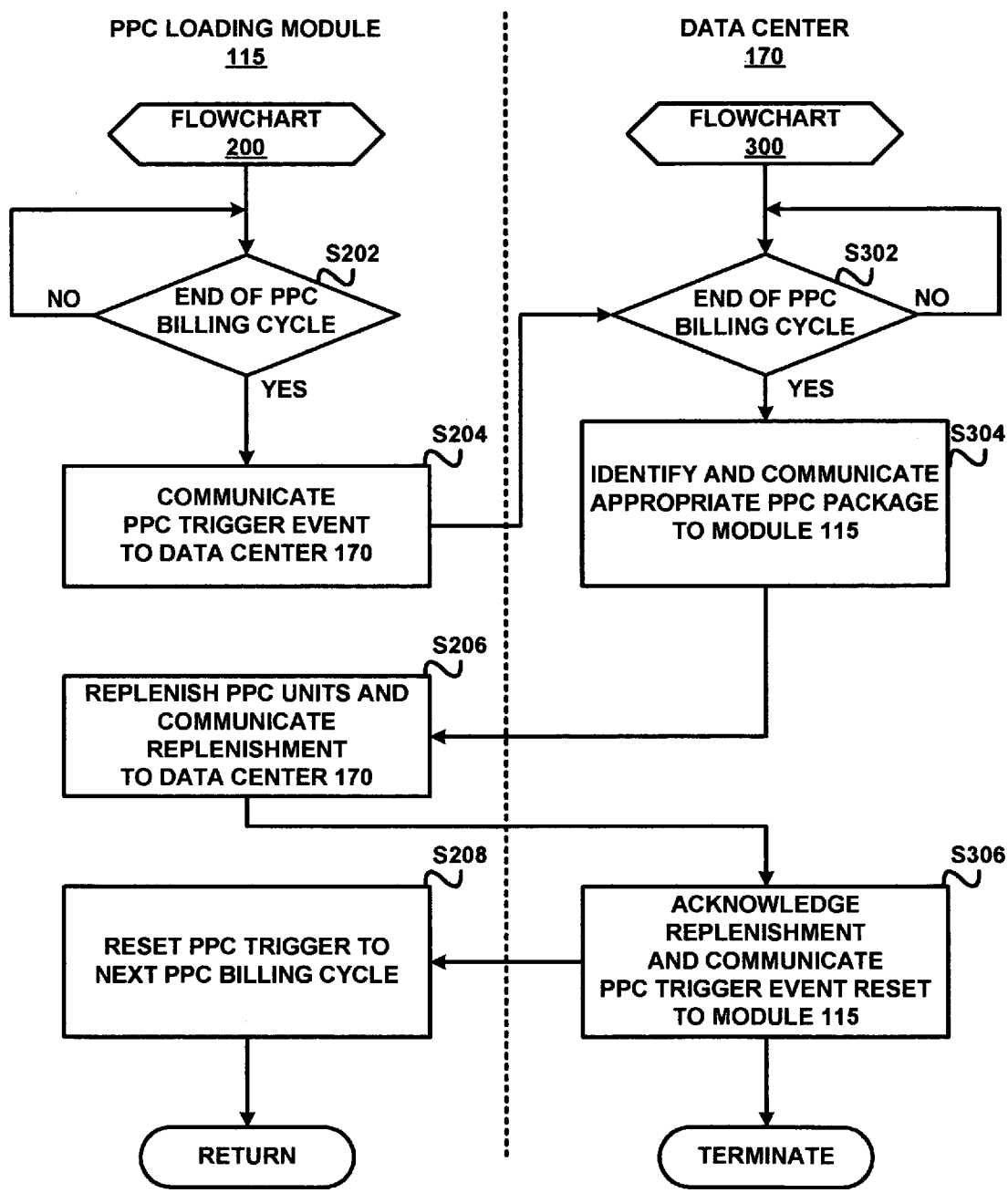
FIG. 2 illustrates a flowchart representative of one embodiment in accordance with the present invention of a method for automatically replenishing pre-paid calling units within a telematics unit at the end of a billing cycle.

FIG. 2 illustrates a flowchart 200 and a flowchart 300 that are executed by PPC loading module 115 and data center 170, respectively, in implementing an automated monthly PPC unit replenishment method of the present invention.

While in practice telematics unit 120 can have any PPC billing cycle, flowcharts 200 and 300 will be described herein as if telematics unit 120 has a PPC billing cycle that occurs the 1$^{st}$ of every month.

In operation, during a stage S202 of flowchart 200, PPC loading module 115 monitors a calendar to thereby detect an occurrence of an end of a PPC billing cycle for telematics unit 120. PPC loading module 115 proceeds from stage S202 to a stage S204 upon detecting an end of the current billing cycle for telematics unit 120 (e.g., January 1$^{st}$). During stage S204, telematics unit 120 conventionally connects with data center 170 to communicate the end of the PPC billing cycle as a PPC trigger event to data center 170. A PPC trigger event indicates one of various events (e.g., end-of-billing-cycle and interim unit replenishing). Thus, in response thereto, data center 170 determines during a stage S302 of flowchart 300 if the PPC trigger event indicates an event of a billing cycle for telematics unit 120, and if so, call center 170 automatically proceeds to a stage S304 to identify and communicate an appropriate PPC unit package to PPC loading module 115. In one embodiment of stage S304, call center 170 identifies the PPC unit package from a customer account associated with telematics unit 120 and automatically uploads the PPC unit package to PPC loading module 115. For example, the automatically uploaded PPC unit package may be a first replenishment package after the first detection of a trigger event, or the PPC unit package may be a second replenishment package after the second detection of a trigger event. Subsequent packages (third, fourth fifth, etc.) are also included herein. The replenishment packages (first, second, etc.) may be either a fixed number of PPC units, e.g. 150, or the replenishment packages may be a variable number of PPC units sufficient to increase the existing PPC units to a certain number, e.g. 150. Thus, for example, if a telematics unit currently has 14 PPC units, the first (second, etc.) replenishment package may add 150 PPC units (making the total 164 units in the telematics unit), or the replenishment package may increase the existing units to 150 by adding 136 PPC units.

Upon receipt of the PPC unit package by PPC loading module 115, telematics unit 120 replenishes its PPC units and PPC loading module 115 communicates the replenishment of the PPC units to call center 170 during a stage S206. During a stage S306, call center 170 acknowledges the replenishment of the PPC units by telematics unit 120 and communicates an PPC trigger reset to PPC loading module 115, which resets the PPC trigger to the end of the next billing cycle (e.g., February 1$^{st}$) during a stage S208. PPC loading module 115 thereafter returns to stage S202 to monitor the calendar, while call center 170 terminates flowchart 300 until call center 170 receives another PPC trigger event from PPC loading module 115.

Figure 3:
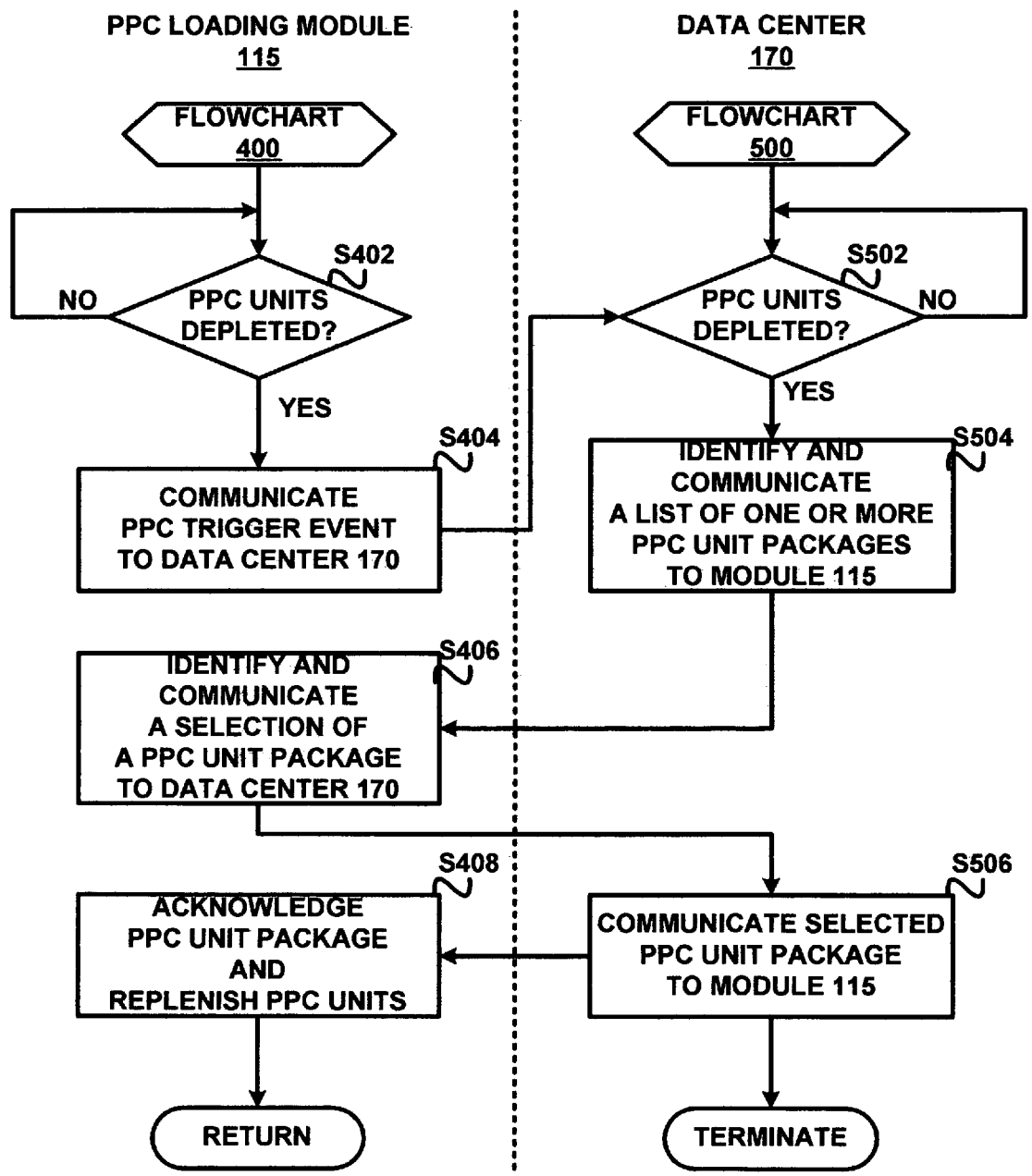
FIG. 3 illustrates a flowchart representative of one embodiment in accordance with the present invention of a method for automatically replenishing pre-paid calling units within a telematics unit upon a complete consumption of the calling units.

FIG. 3 illustrates a flowchart 400 and a flowchart 500 that are executed by PPC loading module 115 and call center 170, respectively, in implementing an automated interim PPC unit replenishment method of the present invention. The purpose of this method is to replenish the PPC units of telematics unit 120, if necessary, during a PPC billing cycle.

In operation, during a stage S402 of flowchart 400, PPC loading module 115 monitors a consumption of PPC units by telematics unit 120 to thereby detect an occurrence of a depletion of the PPC units of telematics unit 120. PPC loading module 115 proceeds from stage S402 to a stage S404 upon a detection of a depletion of the PPC units. During stage S404, PPC loading module 115 conventionally connects to data center 115 to report and communicate the depletion of the PPC units as a PPC trigger event to call center 170. In response thereto, call center 170 determines during a stage S502 of flowchart 500 if the PPC trigger event indicates a depletion of the PPC units for telematics unit 120, and if so, automatically proceeds to a stage S504 to identify and deliver one or more PPC unit packages to telematics unit 120. In selecting which PPC unit package(s) to offer, call center 170 considers (1) the size of the depleted PPC unit package, (2) the date the depleted PPC unit package was first utilized by telematics unit 120, and (3) the current date. In one embodiment, call center 170 calculates a baseline PPC unit package as a function of a product of (1) an average of the minutes per day used by telematics unit 120 during a consumption of the depleted PPC unit package, and (2) the number of days remaining before the end of the current billing cycle. In selecting the PPC unit packages to offer to telematics unit 120, call center 170 uses (1) the baseline number of PPC units, and/or (2) rounds up the baseline number of PPC units by "x" units (e.g., 10 or 25).

Upon receipt of the offered PPC unit package(s) during a stage S406, a user of PPC loading module 115 can either (1) select an offered PPC unit package or (2) request a different PPC unit package that has more or less PPC units than the current offered PPC unit package(s). PPC loading module 115 eventually communicates a final selection of an offered PPC unit package to call center 170, which communicates the selected PPC unit package to PPC loading module 115 during a stage S506. In one embodiment of stage S304, call center 170 automatically uploads the selected PPC unit package to PPC loading module 115.

Upon receipt of the selected PPC unit package, telematics unit 120 replenishes its PPC units and PPC loading module 115 communicates the replenishment of the PPC units to call center 170 during a stage S408. PPC loading module 115 thereafter returns to stage S402 to monitor a consumption of the PPC units by telematics unit 120, while call center 170 terminates flowchart 500 until such time call center 170 receives another PPC trigger event from PPC loading module 115.

From the preceding descriptions herein of flowcharts 200–300 as illustrated in FIGS. 2 and 3, those having ordinary skill in the art will appreciate various advantages of the present invention, such as, for example, an elimination of a need for a customer to have to call a data center or the like to purchase more PPC units at the end of a billing cycle or upon a depletion of PPC units during a billing cycle. Furthermore, those having ordinary skill in the art will appreciate that, in practice, the automated monthly PPC replenishment method and the automated interim PPC replenishment method of the present invention can be individually executed as described and illustrated herein, or merged into single PPC replenishment method.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. In a system including a telematics unit and a data center, a method for automatically replenishing calling units within the telematics unit, the method comprising:
   operating the telematics unit to automatically detect an occurrence of a trigger event to the data center; and
   operating the data center to communicate a replenishment package to the telematics unit subsequent to the detection of the trigger event, wherein the replenishment package includes a first set of calling units.

2. The method of claim 1, wherein the operation of the telematics unit to automatically report the occurrence of a trigger event to the data center includes:

operating the telematics unit to monitor a calendar to thereby facilitate a detection of an end of a current billing cycle; and operating the telematics unit to communicate the occurrence of the trigger event to the data center upon the detection of the end of the current billing cycle.

3. The method of claim 2, further comprising:

operating the data center to identify the replenishment package based on an association of the telematics unit and a customer account in response to the communication of the occurrence of the trigger event by the telematics unit.

4. The method of claim 2, further comprising:

operating the data center to communicate a trigger event reset to the telematics unit subsequent to the telematics unit replenishing itself with the first set of calling units; and operating the telematics unit to reset the trigger event to the end of the next billing cycle in response to a reception of the trigger event reset.

5. The method of claim 1, wherein an operation of the telematics unit to automatically detect and communicate an occurrence of a trigger event to the data center includes:

operating the telematics unit to monitor a consumption of a second set of calling units by the telematics unit to thereby facilitate a detection of a depletion of the second set of calling units; and operating the telematics unit to communicate the occurrence of the trigger event to the data center upon the detection of the depletion of the second set of calling units.

6. The method of claim 5, further comprising:

operating the data center to identify and deliver at least one replenishment package to the telematics unit in response to the communication of the detected depletion of the second set of calling units;

operating the telematics unit to select the replenishment package from the offered at least one replenishment package, wherein the data center automatically communicates the replenishment package in response to the selection of the replenishment package by the telematics unit.

7. The method of claim 6, wherein the data center identifies the at least one replenishment package as a function of a consumption rate of calling units by the telematics unit.

8. The method of claim 1, further comprising:

operating the telematics unit to automatically replenish itself with the first set of calling units in response to a reception of the replenishment package.

9. A system, comprising:

a telematics unit operable to automatically detect an occurrence of a trigger event to said data center; and a data center operable to communicate a replenishment package to said telematics unit subsequent to the occurrence of the trigger event, wherein the replenishment package includes a first set of calling units, and wherein said telematics unit is further operable to automatically replenish itself with the first set of calling units in response to a reception of the replenishment package.

10. The system of claim 9, wherein said telematics units includes:

means for monitoring a calendar to thereby facilitate a detection of an end of a current billing cycle; and means for communicating the occurrence of the trigger event to said data center upon the detection of the end of the current billing cycle.

11. The system of claim 10, wherein said data center includes means for identifying the replenishment package based on an association of said telematics unit and a customer account.

12. The system of claim 9, wherein said data center is further operable to communicate a trigger event reset to said telematics unit subsequent to said telematics unit replenishing itself with the first set of calling units; and wherein said telematics unit is further operable to reset the trigger event to the end of the next billing cycle in response to a reception of the trigger event reset.

13. The system of claim 9, wherein said telematics unit includes:

means for monitoring a consumption of a second set of calling units by said telematics unit to thereby facilitate a detection of a depletion of the second set of calling units; and means for communicating the occurrence of the trigger event to said data center upon the detection of the depletion of the second set of calling units.

14. The system of claim 11, further comprising:

wherein said data center is further operable to identify and offer at least one replenishment package to said telematics unit in response to the communication of the detected depletion of the second set of calling units;

wherein said telematics unit is further operable to select the replenishment package from the offered at least one replenishment package; and wherein said data center automatically communicates the replenishment package in response to the selection of the replenishment package by said telematics unit.

15. The system of claim 11, wherein said data center identifies the at least one replenishment package as a function of a consumption rate of calling units by said telematics unit.

16. A telematics unit, comprising:

means for automatically detecting and communicating an occurrence of a trigger event to a data center; and means for automatically replenishing itself with a first set of calling units in response to a reception of a replenishment package from the data center, wherein the reception of the replenishment package from the data center corresponds to the communicated occurrence of the trigger event.

17. The telematics unit of claim 16, wherein the occurence of the trigger event is an end of a billing cycle.

18. The telematics unit of claim 16, wherein the occurrence of the trigger event is a depletion of a second set of calling units by said telematics unit during a current billing cycle.

19. The telematics unit of claim 16, wherein the replenishment package is associated with a customer account corresponding to said telematics unit.

20. The telematics unit of claim 16, wherein the replenishment package is based on a consumption rate of calling units by said telematics unit.

21. The telematics unit of claim 16, wherein said telematics unit selected the replenishment package from among at least one replenishment package offered by the data center.

* * * * *